(12) United States Patent
Banno et al.

(10) Patent No.: US 7,610,981 B2
(45) Date of Patent: Nov. 3, 2009

(54) DRIVING MODE SWITCHING APPARATUS FOR FOUR-WHEEL-DRIVE VEHICLE

(75) Inventors: Koji Banno, Chiryu (JP); Kensaku Honda, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 173 days.

(21) Appl. No.: 11/937,067

(22) Filed: Nov. 8, 2007

(65) Prior Publication Data
US 2008/0115997 A1 May 22, 2008

(30) Foreign Application Priority Data
Nov. 10, 2006 (JP) .............................. 2006-305712

(51) Int. Cl.
*B60K 17/34* (2006.01)
(52) U.S. Cl. .................. 180/233; 318/430; 318/471
(58) Field of Classification Search .................. 180/242, 180/249, 248, 233; 318/430, 433
See application file for complete search history.

(56) References Cited

U.S. PATENT DOCUMENTS

| | | | |
|---|---|---|---|
| 4,611,154 A * | 9/1986 | Lambropoulos et al. | 318/490 |
| 4,939,437 A * | 7/1990 | Farag et al. | 318/473 |
| 5,896,487 A * | 4/1999 | Masten et al. | 388/811 |
| 6,307,343 B1 * | 10/2001 | Lee et al. | 318/472 |
| 6,335,599 B1 * | 1/2002 | Nonaka et al. | 318/430 |
| 6,338,016 B1 * | 1/2002 | Miller et al. | 701/43 |
| 6,495,982 B2 * | 12/2002 | Katsumata et al. | 318/471 |
| 7,140,457 B2 * | 11/2006 | Ishimaru et al. | 180/53.4 |
| 7,211,025 B2 * | 5/2007 | Fujioka | 477/8 |
| 2002/0043947 A1 * | 4/2002 | Saito et al. | 318/430 |
| 2004/0251070 A1 * | 12/2004 | Sakata et al. | 180/247 |

FOREIGN PATENT DOCUMENTS

| | | |
|---|---|---|
| JP | 2001-071782 A | 3/2001 |
| JP | 3618112 B2 | 2/2005 |

* cited by examiner

*Primary Examiner*—Lesley D Morris
*Assistant Examiner*—Tashiana Adams
(74) *Attorney, Agent, or Firm*—Buchanan Ingersoll & Rooney PC

(57) ABSTRACT

A driving mode switching apparatus for a four-wheel-drive vehicle, which switches driving modes of the four-wheel drive vehicle, includes a motor, a reduction mechanism being transmitted with a rotational force of the motor, an output rod connected to the reduction mechanism and switching the driving modes by being displaced, a housing housing the motor and the reduction mechanism, a temperature sensor arranged at a position away from the motor within the housing and detecting ambient temperature in the housing, and a controller varying an output property of the motor in response to a detected temperature by the temperature sensor.

12 Claims, 6 Drawing Sheets

FIG. 7A
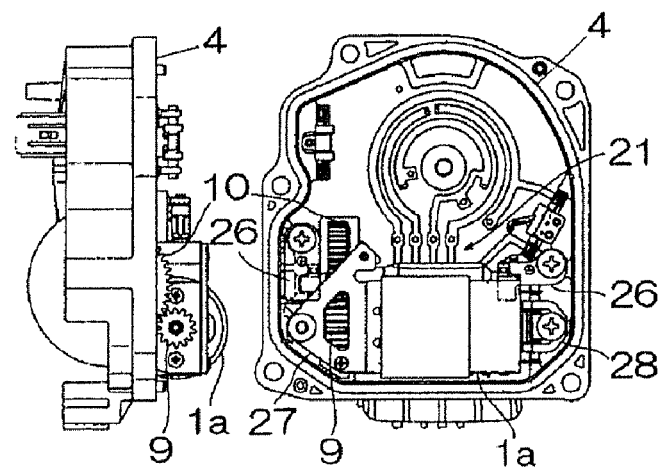
FIG. 7D
FIG. 7B
FIG. 7C
FIG. 8A
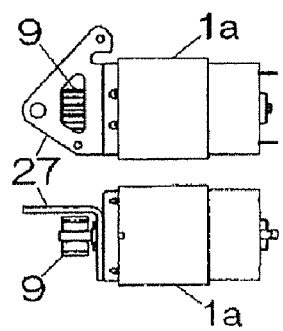
FIG. 8B

DRIVING MODE SWITCHING APPARATUS FOR FOUR-WHEEL-DRIVE VEHICLE

CROSS REFERENCE TO RELATED APPLICATIONS

This application is based on and claims priority under 35 U.S.C. §119 with respect to Japanese Patent Application No. 2006-305712 filed on Nov. 10, 2006, the entire content of which is incorporated herein by reference.

FIELD OF THE INVENTION

The present invention relates to a driving mode switching apparatus for a four-wheel-drive vehicle.

BACKGROUND

Known driving mode switching apparatuses for a four-wheel-drive vehicle, which include a motor (i.e., power source), a reduction mechanism connected to the motor, a spring mechanism (i.e., standby mechanism) connected to the reduction mechanism, an output rod connected to the spring mechanism and which switch drive states of a four-wheel-drive vehicle, are described in JP3618112B and JP2001-71782A. For example, the driving mode switching apparatuses for the four-wheel-drive vehicle switch a two-wheel-drive state and a four-wheel-drive mode, by a displacement of the output rod.

Particularly, the known driving mode switching apparatus for the four-wheel-drive vehicle described in JP2001-71782A includes a temperature sensor for detecting the temperature of the motor, and the energization to the motor is limited when the temperature of the motor reaches a predetermined degree.

The level of the driving force required to displace the output rod of the driving mode switching apparatus (i.e., actuator) for the four-wheel-drive vehicle depends oil situations of an auxiliary transmission and/or a transfer apparatus for a drive train for a vehicle on which a clutch or a sleeve displaced by the output rod are mounted. Particularly, in case of immediately after starting the vehicle in the environment with low temperature, for example, early in the morning, lubrication oil may not be supplied to each portion inside the transfer apparatus and the auxiliary transmission (i.e., generation of a lack of lubrication) and/or the viscosity of the lubrication oil may be high. Under the aforementioned states of the transfer apparatus and/or the auxiliary transmission, in order to switch the driving modes of the transfer apparatus and/or the auxiliary transmission, the driving force required to the driving mode switching apparatus which displaces the sleeve or the clutch, or the like, increases. In other words, the driving force required to the driving mode switching apparatus is susceptible to the influence of the temperature of the auxiliary transmission and the transfer apparatus which is an object to be operated. And in order to stably displace the sleeve or the clutch, or the like, even at the low temperature, the motor of the driving mode switching apparatus needs to be increased in size and in output performance. Thus, there is a drawback that the driving mode switching apparatus per se is increased in size. Further, with the driving mode switching apparatus which includes the motor being increased in size and increased in output performance, there is a drawback that the power consumption when displacing the output rod in the normal temperature is increased.

According to the driving mode switching apparatus described in JP3618112B and JP2001-71782A, because the motor with high output performance is needed to be adopted, the cost for the motor increases, and the size of the driving mode switching apparatus per se increases.

In those circumstances, the temperature sensor for detecting the motor temperature described in JP2001-71782A is used for preventing the overheating of the motor, and is not applied for switching the driving modes of the four-wheel-drive vehicle. Further, because fluctuation rates of the motor temperature are large and the motor temperature fluctuates quickly, there is a risk of generating a phenomenon of, for example, overshooting and/or hunting at the motor output. Accordingly, the motor output is unlikely to be controlled appropriately.

A need thus exists for a driving mode switching apparatus for a four-wheel-drive vehicle which is not susceptible to the drawback mentioned above.

SUMMARY OF THE INVENTION

In light of the foregoing, the present invention provides a driving mode switching apparatus for a four-wheel-drive vehicle, which switches driving modes of the four-wheel drive vehicle, which includes a motor, a reduction mechanism being transmitted with a rotational force of the motor, an output rod connected to the reduction mechanism and switching the driving modes by being displaced, a housing housing the motor and the reduction mechanism, a temperature sensor arranged at a position away from the motor within the housing and detecting ambient temperature in the housing, and a controller varying an output property of the motor in response to a detected temperature by the temperature sensor.

According to another aspect of the present invention, a driving mode switching apparatus for a four-wheel-drive vehicle, which switches driving modes of the four-wheel drive vehicle, includes a driving device, a reduction mechanism being transmitted with a rotational force of the driving device, an output member connected to the reduction mechanism and switching the driving modes by being displaced by the driving device, a housing housing the driving device and the reduction mechanism, a temperature sensor detecting ambient temperature in the housing, and a controller controlling an output property of the driving device in response to a detected temperature by the temperature sensor.

BRIEF DESCRIPTION OF THE DRAWINGS

The foregoing and additional features and characteristics of the present invention will become more apparent from the following detailed description considered with reference to the accompanying drawings, wherein:

FIG. 7A is a top view for explaining a reduction mechanism shown in FIG. 6.

FIG. 7B is a front view for explaining a worm bearing structure of the driving mode switching apparatus of FIG. 7A.

FIG. 7C is a front view for explaining a motor support structure of the driving mode switching apparatus of FIG. 7A.

FIG. 7D is a left lateral view of the driving mode switching apparatus of FIG. 7A.

FIG. 8A is a top view for explaining a supporting structure of the motor shown in FIG. 4.

FIG. 8B is a front view of the supporting structure of the motor of FIG. 8A.

DETAILED DESCRIPTION

Figure 1:
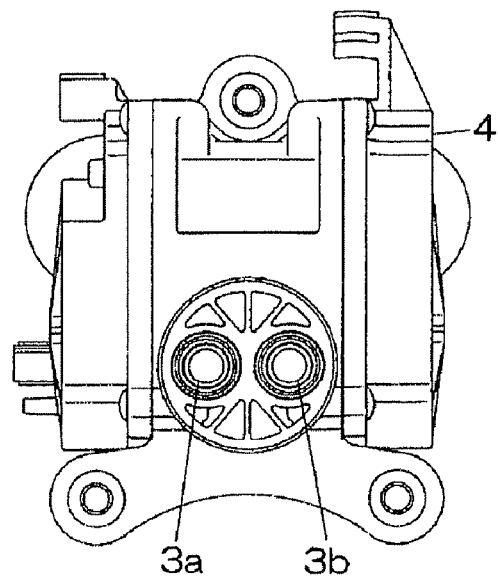
FIG. 1 is a front-view showing an external front view of a driving mode switching apparatus for a four-wheel-drive vehicle according to an embodiment of the present invention.

According to an embodiment of the present invention, a driving mode switching apparatus includes a motor (i.e., serving as a driving device), a reduction mechanism, an output rod (i.e., serving as an output member), a housing, a temperature sensor, and a controller (i.e., serving as a control means). The motor includes first and second motors, the reduction mechanism includes a first reduction mechanism connected to the first motor and a second reduction mechanism connected to the second motor. The output rod includes a first output rod, which switches at least a two-wheel-drive mode and a four-wheel-drive mode, and a second output rod, which changes a reduction ratio (i.e., a reduction ratio of a transfer including an auxiliary transmission, or any device operated by the output rod) or which switches a locked mode and free mode of a center differential in the four-wheel-drive mode. The housing includes a first chamber, which houses the first motor and the first reduction mechanism, and includes a second chamber, which houses the second motor and the second reduction mechanism. The temperature sensor is arranged within the first chamber. Further, the temperature sensor is arranged at a position which is away from the both of the first motor and the first reduction mechanism.

According to the embodiment of the present invention, the temperature sensor is positioned being away from the reduction mechanism.

According to the embodiment of the present invention, the temperature sensor is arranged in the chamber which houses a first driving mode switching apparatus for driving the first output rod which switches at least the two-wheel-drive mode and the four-wheel-drive mode, and is applied at least to control the first driving mode switching apparatus. The temperature sensor may also be applied to control other apparatuses depending on situations.

According to the embodiment of the present invention, the driving mode switching apparatus is applicable to a four-wheel-drive vehicle having constructions explained hereinbelow. The four-wheel-drive vehicle includes a synchronizing device for a transfer having a shift fork linked to the output rod serving as an output member for the driving mode switching apparatus, a sleeve linked to the shift fork, a shift fork shaft to which the sleeve is attached via a spline, and at least one gear idly fitted to the shift fork shaft. The driving modes are switched by engaging or disengaging the sleeve to or from the predetermined gear.

According to the embodiment of the present invention, the driving mode switching apparatus is applicable to a four-wheel-drive vehicle having constructions explained hereinbelow. In addition to a transfer, the four-wheel-drive vehicle includes a center differential lock mechanism. The driving mode switching apparatus includes a dual circuit driving mode switching apparatus which switches driving modes of each of the transfer and the center differential lock mechanism. The center differential lock mechanism switches the driving modes via, for example, the synchronizer. According to an embodiment of the present invention described hereinafter, the driving mode switching apparatus is applied to a vehicle provided with at least a transfer and a center differential lock mechanism. However, the types of the vehicle is not limited and, for example, the driving mode switching apparatus may be applied to a vehicle which includes a switching mechanism which switches a differential locked state and a differential unlocked state for wheels at the right and left in a four-wheel-drive mode.

According to the embodiment of the present invention, the reduction mechanism provided between the motor and the output rod includes a reduction mechanism achieving multiple reduction ratios. The reduction mechanism may further include a pair of reduction gears which are arranged in parallel to each other and a worm wheel mechanism in order to attain large reduction gear ratio while arranging the driving mode switching apparatus compactly.

According to the embodiment of the present invention, pair of the reduction gears are arranged between a rotation shaft of the motor and a worm shaft which is in parallel to the rotation shaft of the motor, and a worm wheel which is geared with a worm which integrally rotates with the worm shaft is positioned opposing to a main portion of the motor. Accordingly, the driving mode switching apparatus is formed compactly and thus downsized.

According to the embodiment of the present invention, the driving mode switching apparatus includes a first driving mode switching apparatus which switches at least two-wheel drive mode and four-wheel drive mode, and which may be capable of switching the center differential to a locked state during the four-wheel drive mode. The driving mode switching apparatus further includes a second driving mode switching apparatus which switches other driving modes, for example, which changes the reduction ratio between high and low, or which switches a locked state of the center differential and an free state of the center differential during the four-wheel-drive mode. The driving mode switching apparatus further includes a housing having a first chamber which houses the first driving mode switching apparatus, a second chamber which houses the second driving mode switching apparatus. A driving source (e.g., a motor) of the first driving mode switching apparatus may be housed in the first chamber. A temperature sensor may be arranged at a position which is away from the reduction mechanism. Based on the detected temperature by the temperature sensor in the first chamber, output properties of at least the first driving mode switching apparatus, particularly, an output property of the motor is variably controlled in response to the degree of the temperature.

According to the embodiment of the present invention, the temperature sensor is provided in the housing which houses the driving mode switching apparatus, and an ECU serving as a controller reads in a temperature detection signal outputted from the temperature sensor to be reflected on a motor electric current value (i.e., switching load).

According to the embodiment of the present invention, by varying the motor electric current, the output properties of the motor are varied in response to the temperature. For example, the motor electric current is variably controlled by a duty control, a PWM control, or the like, so that a torque outputted from the motor becomes variable.

According to the embodiment of the present invention, the driving mode switching apparatus may be applied to four-wheel-drive vehicles described in JP3618112B and JP2001-71782A. A reduction mechanism, standby mechanism, a limit switch mechanism, and a control for an ON-OFF timing of the motor, or the like, described in JP3618112B and/or JP2001-71782A may be applied to the driving mode switching apparatus.

One embodiment of the present invention will be explained with reference to illustrations of the drawing figures as follows.

As shown in FIGS. 1-6, a driving mode switching apparatus for a four-wheel drive vehicle includes a first driving mode switching apparatus A which switches a two-wheel drive 2WD mode and a four-wheel drive 4 WD mode, and further switches driving modes to a center differential locked state 4Lock during the four-wheel drive. The driving mode switching apparatus for a four-wheel drive vehicle further includes a second driving mode switching apparatus B which switches High and Low of reduction ratio. The first driving mode switching apparatus A is connected to a transfer and a center differential lock mechanism. The second driving mode switching apparatus B is connected to an auxiliary transmission. Although the second driving mode switching apparatus B switches the reduction ratio to be High or Low according to the example of the embodiment, the reduction ratio may be switched between more than three ratios or may be linearly changed depending on a construction of a transfer or an auxiliary transmission.

A housing 4 of the driving mode switching apparatus is divided into a first chamber 4a and a second chamber 4b. The first driving mode switching apparatus A is housed in the first chamber 4a, and the second driving mode switching apparatus B is housed in the second chamber 4b.

The first driving mode switching apparatus A includes a first motor 1a, a first reduction mechanism 2a transmitted with rotational force of the first motor 1a, a first output rod 3a which is connected to the first reduction mechanism 2a and switches driving modes of two-wheel-drive and four-wheel drive or switches driving modes of a locked state and a free state of the center differential lock mechanism by being displaced, the first chamber 4a of the housing 4 which houses the first motor 1a and the first reduction mechanism 2a, a temperature sensor 5 which is arranged in the first chamber 4a at a position being away from the first motor 1a and detects the ambient temperature in the housing 4, particularly, in the first chamber 4a, and an ECU (i.e., serving as a controller) 6 which varies output properties of at least the first motor 1a in response to the detected temperature of the temperature sensor 5.

The first driving mode switching apparatus A further includes a first standby mechanism 7a which is connected between the first reduction mechanism 2a and the first output rod 3a.

Figure 2:
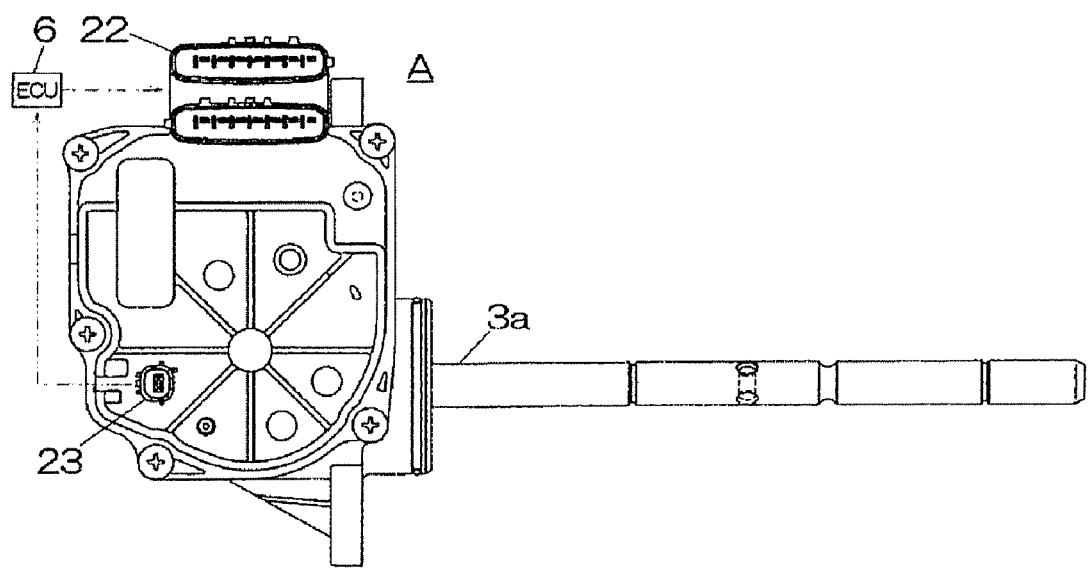
FIG. 2 is a left lateral view of FIG. 1.
Figure 3:
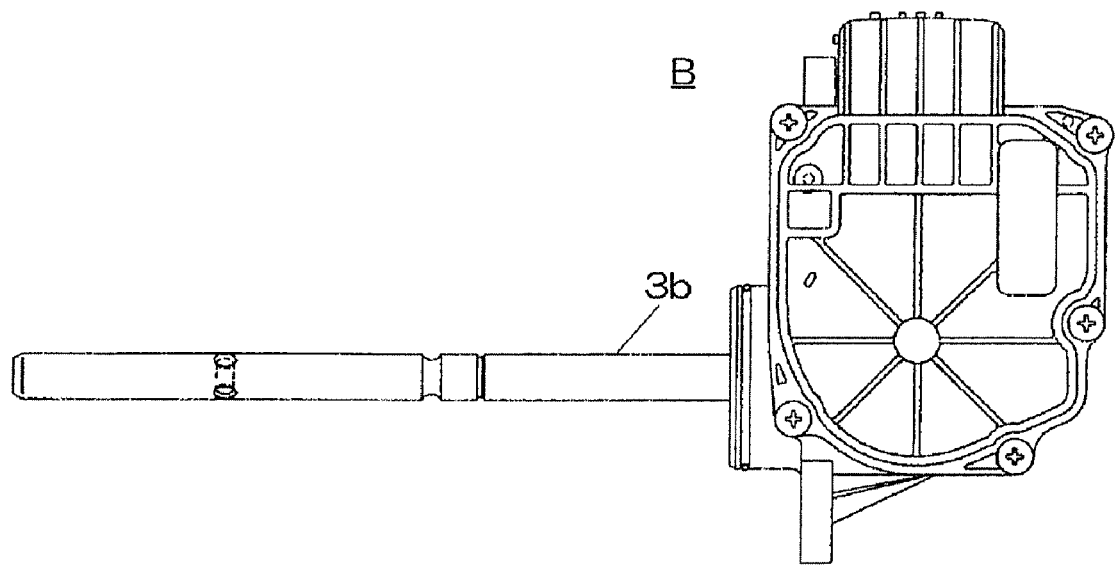
FIG. 3 is a right lateral view of FIG. 1.

As shown in FIG. 2, a connector 22 for a motor control and a connector 23 for the temperature sensor 5 are attached on the housing 4 enclosing the first chamber 4a. A signal outputted from the temperature sensor 5 is inputted into the ECU 6 via the connector 23 for the temperature sensor 5, and the ECU 6 controls output properties of at least the first motor 1a to be variable based on the inputted signal.

The second driving mode switching apparatus B includes a second motor 1b, a second reduction mechanism 2b transmitted with rotational force of the second motor 1b, a second output rod 3b which is connected to the second reduction mechanism 2b and switches driving modes to switch High and Low of the reduction ratio by being displaced, the second chamber 4b of the housing 4 which houses the second motor 1b and the second reduction mechanism 2b, and the ECU 6 (i.e., common to the ECU 6 for the first driving mode switching apparatus A) which controls the second motor 1b.

The second driving mode switching apparatus B further includes a second standby mechanism 7b connected between the second reduction mechanism 2b and the second output rod 3b.

The first chamber 4a houses the first motor 1a, the first reduction mechanism 2a, the first standby mechanism 7a, and the temperature sensor 5. The second motor 1b, the second reduction mechanism 2b, and the second standby mechanism 7b are housed in the second chamber 4b. However, a sensor corresponding to the temperature sensor 5 is not housed in the second chamber 4b.

Reasons why the temperature sensor 5 is provided only in the first chamber 4a will be explained as follows. A load required to switch the two-wheel drive and the four-wheel drive is greater than a load required to switch High and Low of the reduction ratio. That is, a motor electric current supplied to the second motor 1b is originally less than a motor electric current supplied to the first motor 1a. Thus, by variably controlling output properties of the first motor 1a in response to the temperature, in other words, by increasing a motor electric current supplied to the first motor 1a at a low temperature (e.g., conditions where lubrication fluid is not sufficiently supplied or the viscosity of the lubrication fluid is high), and by decreasing the motor electric current at the other temperatures, the appropriate load is applied to switch the two-wheel drive and the four-wheel drive at the low temperature and the sufficient load is applied to switch the reduction ratios even if the motor electric current supplied to the second motor 1b is not variable.

Further, reasons why the temperature sensor 5 is arranged at the position away from the first motor 1a in the first chamber 4a will be explained as follows. For example, because a load required to switch the two-wheel drive and the four-wheel drive is large at the low temperature condition, a motor electric current supplied to the first motor 1a is greater, thus increasing the motor temperature. However, when output properties of the first motor 1a are controlled based on the temperature of the first motor 1a, a control for switching the driving modes becomes rather unstable because a rate of motor temperature change is too large.

According to the embodiment of the present invention, the temperature sensor 5 is arranged at the position also away from the first reduction mechanism 2a. This is because a control for switching driving modes becomes unstable when the temperature sensor 5 directly detects the heat from the first reduction mechanism 2a because a fluctuation width (range) of a frictional heat generated at the first reduction mechanism 2a is large.

An operation of the driving mode switching apparatus for the four-wheel-drive vehicle according to the embodiment of the present invention will be explained referring to a flowchart shown in FIG. 10 as follows.

Table 1 shows controlling conditions of the driving mode switching apparatus for the four-wheel-drive vehicle according to the embodiment of the present invention.

| Item | | At low temperature | At normal and high temperature |
|---|---|---|---|
| Motor output properties | Torque | Large | Small |
|  | Rotation speed | High | Low |
| Frictional coefficient by grease | | Large | Small |

Figure 4:
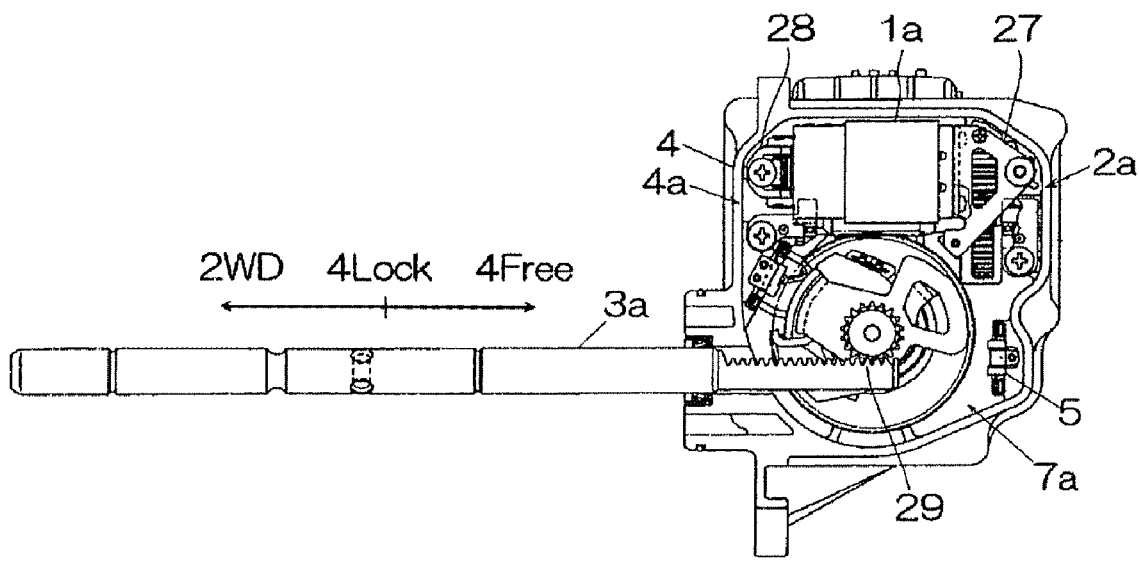
FIG. 4 is a rear view of an inside of FIG. 2.
Figure 5:
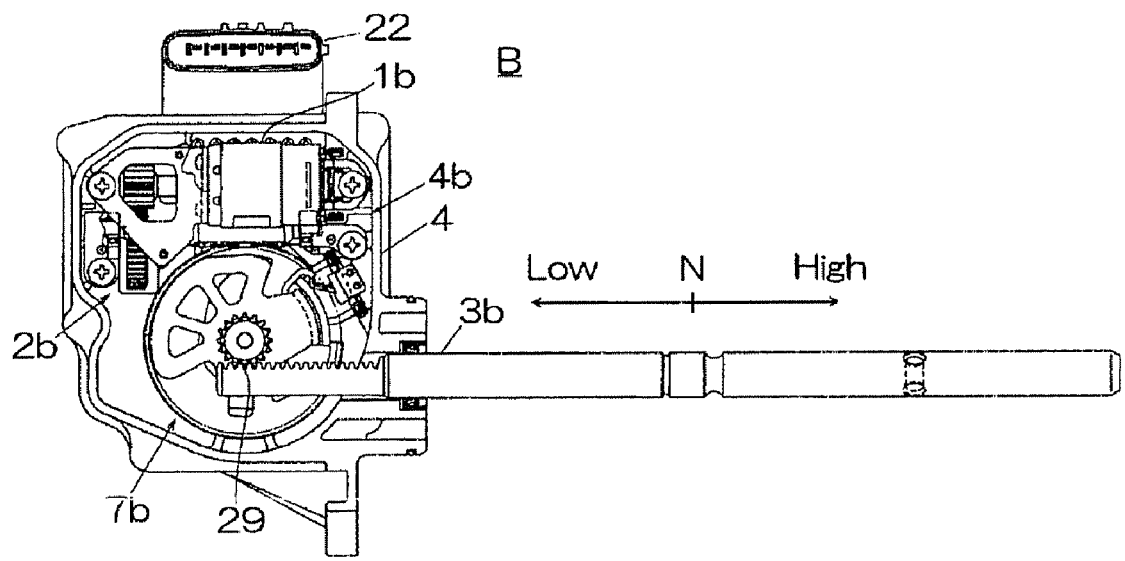
FIG. 5 is a rear view of an inside of FIG. 3.
Figure 6:
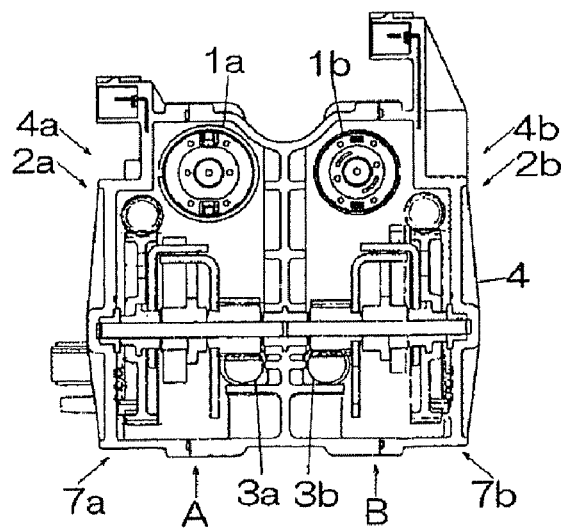
FIG. 6 is a front view showing an inside of the driving mode switching apparatus of FIG. 1.
Figure 10:
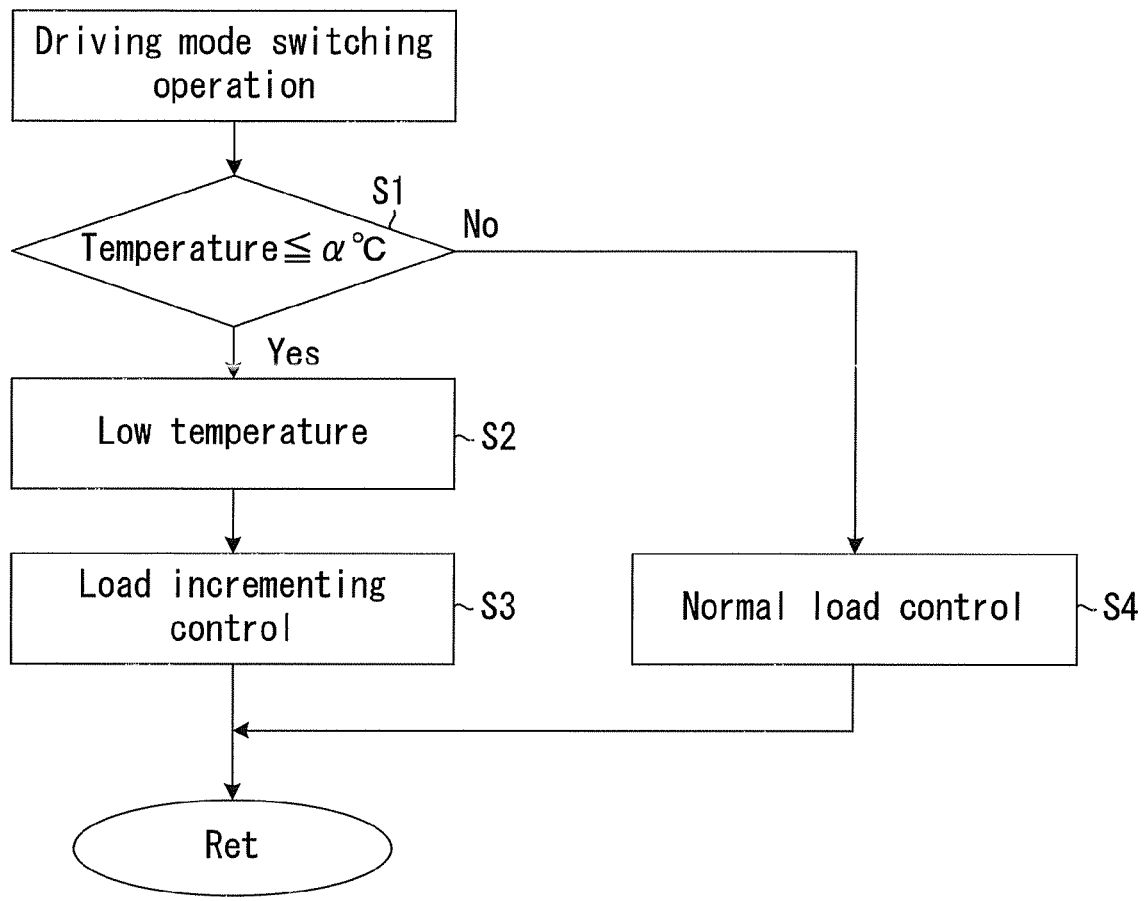
FIG. 10 is a flowchart for explaining a basic operation of the driving mode switching apparatus for the four-wheel-drive vehicle according to the embodiment of the present invention.

As shown in FIG. 10 and Table 1, when switching driving modes, first, the temperature of the predetermined ambient detected by the temperature sensor 5 shown in FIG. 4 is compared to a set temperature α (i.e., Step S1). Because the frictional coefficient at the first reduction mechanism 2a, or the like, is increased by the grease applied to the first reduction mechanism 2a, and thus the driving force required to operate the first reduction mechanism 2a to operate the first output rod 3a is increased when the detected temperature of the ambient is lower than the set temperature α (i.e., Step S2), the motor control at the low temperature shown in Table 1, that is, a load incrementing control which increases a torque by incrementing the motor electric current supplied to the first motor 1a shown in FIG. 4 (i.e., Step S3) is executed. When the detected temperature of the ambient detected by the temperature sensor 5 is lower than the set temperature, a normal load control, that is, the motor control at normal and high temperature shown in Table 1 is executed to shorten a time required for switching the driving modes.

Next, structures of the first and second reduction mechanisms 2a, 2b and a structure for supporting the motor will be explained as follows. Because the first and second reduction mechanisms include common constructions, the construction of the first reduction mechanism 2a will be explained and the construction of the second reduction mechanism will not be repeated. Because the structures for supporting the motors 1a and 1b are also common, the construction for supporting the motor 1a will be explained and the construction for supporting the motor 1b will not be repeated.

As shown in FIGS. 6 and 7A-7D, the first reduction mechanism 2a includes a motor rotational shaft 8, a first pinion (i.e., small pinion) 9 which integrally rotates with the motor rotational shaft 8, a second pinion (i.e., reduction gear, or large pinion) 10 which is geared with the first pinion, a worm shaft 11 which is integrally rotated with the second pinion 10 and is arranged in parallel to the motor rotational shaft 8, a worm 12 which is integrally rotated with the work shaft 11, a worm wheel 13 (See FIG. 9A) which is geared with the worm 12, and a wheel shaft (i.e., output shaft) 14 (See FIG. 9A) on which the work wheel 13 is idly fitted.

Figure 9A:
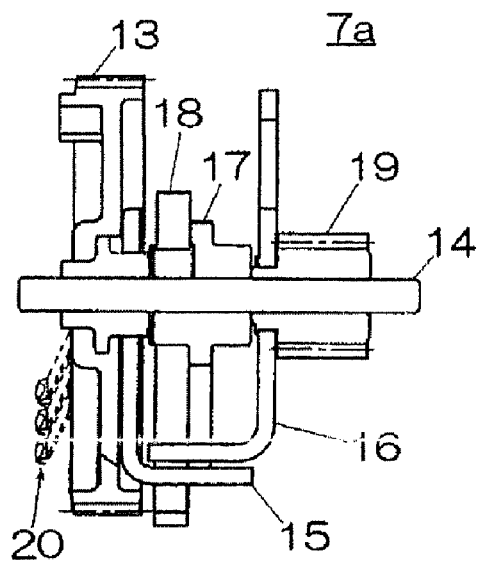
FIG. 9A is a partially magnified view showing a standby mechanism of FIG. 4.

As shown in FIG. 9A, plural electrodes 20 are attached on an end of the worm wheel 13. Plural terminals 21 which are electrically in contact with the plural electrodes 20 are arranged on the housing 4. In response to the rotational position of the worm wheel 13, the predetermined electrode 20 and the predetermined terminal 21 are electrically in contact so that the first motor 1a is controlled to be energized or not energized. In consequence, a displacement of the first output rod 3a is controlled, and a mode switching control for the two-wheel drive mode, the four-wheel drive mode, or the four-wheel center differential lock driving mode.

Because a worm wheel mechanism including the worm 12 and the worm wheel 13 attains large reduction ratio s, the first motor 1a is downsized and the required motor electric current is further reduced. Because the worm 12 and the worm wheel 13 transmit the power while sliding to each other, changes in the frictional force of the worm 12 and the worm wheel 13 depending on the temperature change is significant. Thus, in case of applying a sliding transmission mechanism, for example, a worm wheel mechanism, to the reduction mechanism of the embodiment of the present invention, it is preferable to position the temperature sensor 5 away from the reduction mechanism, particularly, from the worm wheel mechanism.

By providing a pair of reduction gears including the first and second pinions 9, 10 at an upstream side of the worm 12, the first motor 1a is downsized, and the motor electric current is further reduced.

Further, by providing the pair of the reduction gears at a tip end side of the motor rotational shaft 8 and by arranging the worm wheel mechanism including the worm 12 and the worm wheel 13 at the position opposing to a main body of the first motor 1a avoiding being positioned on an axial line of the motor rotational shaft 8, the first driving mode switching apparatus A is structured in a compact size.

Hereinafter, a bearing structure of the worm shaft will be explained in details as follows.

As shown in FIGS. 7A-7C, the housing 4 is formed with U-shaped grooves 24, 24 having a channel-shaped opening. On the U-shaped grooves 24, 24, worm bearings 25, 25 which rotatably support the both ends of the worm shaft 11 are fitted respectively. The worm bearings 25, 25 are biased towards the inside of the U-shaped grooves 24, 24 by means of plate spring members 26, 26 having elastic properties respectively. Accordingly, shakiness of the worm wheel mechanism which achieves large degree of the reduction ratio during the operation is restrained.

Next, a motor supporting structure will be explained in details as follows.

As shown in FIGS. 4, 7A, 7B, 8A and 8B, a first attaching member 27 is attached on a first end surface of the first motor and a second attaching member 28 is attached on a second end surface of the first motor. The first attaching member 27 includes a portion facing the first end surface of the first motor 1a and fixed thereto and a portion facing an upper surface of the housing 4 and fixed thereto. The both portions are arranged to intersect vertically each other and the first and second pinions 9, 10 are efficiently arranged in terms of the space. The second attaching member 28 includes a portion facing the second end surface of the first motor 1a and fixed thereto and a portion facing the upper surface of the housing 4 and fixed thereto. The both portions are arranged to intersect vertically each other. Because the first attaching member 27 and the second attaching member 28 support the first motor 1a from the both sides along a direction of the rotational shaft, shakiness of the first motor 1a is prevented.

Constructions of the first and second standby mechanisms 7a, 7b will be explained as follows. Because the first and second standby mechanisms 7a, 7b include identical constructions, for the explanatory purpose, only the first standby mechanism 7a will be explained, and the explanations for the second standby mechanism 7b will not be repeated.

Figure 9B:
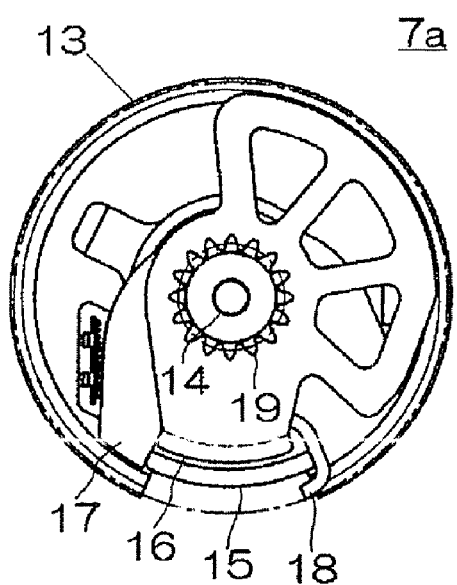
FIG. 9B is a right lateral view of the standby mechanism of FIG. 4.

As shown in FIGS. 4, 9A and 9B, the first standby mechanism 7a includes a wheel shaft (output shaft) 14 on which the worm wheel 13 is idly fitted at a first side thereof and on which a third pinion (output pinion) 19 is fitted to a second side thereof so as to integrally rotate, a first plate which integrally rotates with the worm wheel 13, a second plate 16 which integrally rotates with the wheel shaft 14 and the third pinion 19, a bush member 17 which is idly fitted to the wheel shaft 14, and a spiral-shaped spring 18 whose inner end portion is attached to the bush member 17 and whose outer end portion is engaged with the first plate 15 at least in a rotating direction.

Each of the first plate 15 and the second plate 16 include a portion which is sandwiched between the bush member 17 and the spring 18 in the rotating direction.

When the first plate 15 rotates in a first direction, the rotational force of the first plate 15 is transmitted in sequence through the bush member 17, the spring 18 and the second plate 16, to the wheel shaft 14. When the first plate 15 rotates in a second direction, the rotational force of the first plate 15 is transmitted in sequence through the spring 18, the bush member 17 and the second plate 16, to the wheel shaft 14.

The third pinion (output gear) 19 is configured to be geared with a rack 29 formed on the first output rod 3a to construct a pinion-rack mechanism, so that the rotational force of the wheel shaft 14 is converted into the force to displace (i.e., shift) the first output rod 3a.

An operation of the first standby mechanism 7a will be explained as follows. When driving states or modes of a four-wheel-drive vehicle is switched, for example, provided that rotations of a sleeve being in connection with a shift fork which is connected to the first output rod 3a and a predetermined gear which is idly fitted to a predetermined shaft on which the sleeve is engaged by a spline are deviated (not matched), the displacement (move) of the first output rod 3a is stopped. Accordingly, a rotation of the wheel shaft 14 is also stopped, and the rotational force of the first motor 1a is stored at the spring 18. Consequently, even when the rotation of the first motor 1a is stopped, a torque stored in the spring 18 rotates the wheel shaft 14 to displace (move) the first output rod 3a. In a case where the first output rod 3a is displaced in the reverse direction from the predetermined direction, provided that the sleeve and the predetermined gear are firmly engaged by means of the spline, the first output rod 3a does not start to move immediately and thus the wheel shaft 14 does not rotate, and the rotational force of the first motor 1a is stored at the spring 18. Accordingly, even when the rotation of the first motor 1a is stopped, in response to the loose of the engagement between the sleeve and the gear by the spline, a torque stored in the spring 18 acts on the wheel shaft 14 to rotate, displaces the first output rod 3a, and completely disengages the sleeve and the gear by the spline.

The driving mode switching apparatus according to the embodiment of the present invention is applicable to a four-wheel-drive vehicle which switches at least a two-wheel drive mode and a four-wheel drive mode, is applicable to a four-wheel-drive vehicle which switches at least a two-wheel drive mode, a four-wheel drive mode, and a four-wheel differential lock drive mode, and is applicable to a four-wheel drive vehicle which switches at least High and Low of reduction ratios.

Although the first output rod 3a (or the first driving mode switching apparatus A) switches driving modes of two-wheel-drive and four-wheel drive or modes of a locked state and a free state of the center differential lock mechanism, and the second output rod 3b (or the second driving mode switching apparatus B) switches driving modes to switch High and Low of the reduction ratio according to the embodiment of the present invention, combinations of the modes which are operated by the first output rod 3a or the second output rod 3b are not limited and may be varied. For example, the first output rod may switch driving modes of the two-wheel drive and four-wheel drive, and the second output rod may switch driving modes of a locked state and a free state of the center differential lock mechanism and switch High and Low of the reduction ratio.

According to the subject matter of the driving mode switching apparatus for the four-wheel-drive vehicle, the motor includes a first motor 1a and a second motor 1b, the reduction mechanism includes a first reduction mechanism 2a connected to the first motor and a second reduction mechanism 2b connected to the second motor 1b, the output rod includes a first output rod 3a which switches at least two-wheel-drive mode and four-wheel-drive modes, and a second output rod 3b which switches a reduction ratio and/or switches a locked state and a free state of a center differential under the four-wheel-drive mode, the housing 4 includes a first chamber housing 4a which houses the first motor 1a and the first reduction mechanism 2a and a second chamber housing 4b which houses the second motor 1b and the second reduction mechanism 2b, and the temperature sensor 5 is arranged in the first chamber 4a.

According to the subject matter of the driving mode switching apparatus for the four-wheel-drive vehicle, the motor includes a first motor 1a and a second motor 1b, the reduction mechanism includes a first reduction mechanism 2a connected to the first motor 1a and a second reduction mechanism 2b connected to the second motor 1b, the output rod includes a first output rod 3a which switches one of two-wheel-drive mode and four-wheel-drive modes, a reduction ratio, and a locked state and a free state of a center differential under the four-wheel-drive mode, and a second output rod 3b which switches at least one of the rest of the two-wheel-drive and four-wheel-drive modes, the reduction ratio, and the locked state and free state of the center differential under the four-wheel-drive mode, the housing 4 includes a first chamber housing 4a which houses the first motor 1a and the first reduction mechanism 2a and a second chamber housing 4b which houses the second motor 1b and the second reduction mechanism 2b, and the temperature sensor 5 is arranged in the first chamber 4a.

According to the subject matter of the driving mode switching apparatus for the four-wheel-drive vehicle, the temperature sensor 5 is arranged at a position away from the reduction mechanism 2a.

According to the subject matter of the driving mode switching apparatus for the four-wheel-drive vehicle, the driving device includes a first driving device 1a and a second driving device 1b, the reduction mechanism includes a first reduction mechanism 2a connected to the first driving device 1a and a second reduction mechanism 2b connected to the second driving device 1b, the output member includes a first output member 3a which switches at least two-wheel-drive mode and four-wheel-drive modes, and a second output member 3b which switches a reduction ratio and/or switches a locked state and a free state of a center differential under the four-wheel-drive mode, the housing 4 includes a first chamber housing 4a which houses the first driving device 1a and the first reduction mechanism 2a and a second chamber housing 4b which houses the second driving device 1b and the second reduction mechanism 2b, and the temperature sensor 5 is arranged in the first chamber 4a.

According to the subject matter of the driving mode switching apparatus for the four-wheel-drive vehicle, the temperature sensor 5 is arranged at a position away from the driving device 1a within the housing 4.

According to the subject matter of the driving mode switching apparatus for the four-wheel-drive vehicle, the temperature sensor 5 is arranged at a position away from the reduction mechanism 2a within the housing.

According to the subject matter of the driving mode switching apparatus for the four-wheel-drive vehicle, the temperature sensor 5 is arranged at a position away from the driving device 1a so that the temperature sensor is not directly in contact with the driving device 1a.

According to the subject matter of the driving mode switching apparatus for the four-wheel-drive vehicle, the temperature sensor 5 is arranged at a position away from the reduction mechanism 2a so that the temperature sensor 5 is not directly in contact with the reduction mechanism 2a.

According to the subject matter of the driving mode switching apparatus for the four-wheel-drive vehicle, a motor 1a serves as the driving device.

According to the subject matter of the driving mode switching apparatus for the four-wheel-drive vehicle, an output rod 3a, 3b serves as the output member.

According to the described subject matter, in the housing 4 which houses the driving mode switching apparatus for the four-wheel-drive vehicle, the temperature sensor 5 which detects the ambient temperature in the housing 4 is arranged at the position away from the motor 1a serving as the drive source and having significant fluctuations of temperature. Based on the detected temperature, the temperatures of the vehicle, the transfer apparatus, and the auxiliary transmission are estimated to vary the output properties of the motor 1a. With the foregoing construction, for example, the following advantages are attained.

First, necessary and sufficient motor output properties are attained depending on the temperature. Namely, the load is changed depending on the temperature ranges. Although two temperature ranges (i.e., low and high including normal) defining thresholds for changing the loads to be applied are adopted according to the embodiment of the present invention, any multiple numbers of thresholds and the temperature ranges for changing the loads may be provided. Second, a torque of the motor 1a is increased, for example, by increasing the motor electric current when the necessity for increasing the thrust of the output rod 3a arises at the low temperature environment where the move of the sleeve and the clutch in the transfer apparatus and the auxiliary transmission, or the like, deteriorates. Oil the other hand, at the high temperature and the normal temperature, by reducing the electric current of the motor 1a, driving states or modes of the transfer apparatus and the auxiliary transmission are switched by using less electric power. Third, because the excessive electric current is prevented from being supplied to the motor 1a by defining thresholds of the output properties of the motor (e.g., switching load or motor electric current value) depending on the temperature, the deterioration of the motor 1a is restrained. Accordingly, a downsized motor is applied as the motor 1a, and thus the manufacturing cost and the dimension of the motor 1a are reduced. Fourth, because the torque is increased by controlling the motor, a motor which is further downsized and has more reasonable cost may be adopted, and particularly, the manufacturing cost is reduced by adopting an all-purpose motor. Fifth, because the temperature is detected at the position away from the part at which the temperature is significantly fluctuated, reliabilities of the motor control, thus reliabilities of the control for switching driving modes is enhanced. In case the output properties of the motor are controlled on the basis of the external temperature, the error is increased based on the heat conduction time between the inside and the outside of the vehicle, the surrounding environment (e.g., exhaust pipe, or the like), or the like. In case the output properties of the motor are controlled on the basis of the motor temperature, because the change of the motor temperature is significant, the control for switching the driving modes becomes rather unstable.

According to the embodiment of the present invention, the driving mode switching apparatus for the four-wheel-drive vehicle displaces an output rod 3a, 3b for switching driving modes of the four-wheel-drive vehicle with constantly appropriate driving force.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving mode switching apparatus for a four-wheel-drive vehicle, which switches driving modes of the four-wheel drive vehicle, comprising:
    a motor;
    a reduction mechanism being transmitted with a rotational force of the motor;
    an output rod connected to the reduction mechanism and switching the driving modes by being displaced;
    a housing housing the motor and the reduction mechanism;
    a temperature sensor arranged at a position away from the motor within the housing and detecting ambient temperature in the housing; and
    a controller varying an output property of the motor in response to a detected temperature by the temperature sensor.

2. The driving mode switching apparatus for the four-wheel-drive vehicle, according to claim 1, wherein
    the motor includes a first motor and a second motor;
    the reduction mechanism includes a first reduction mechanism connected to the first motor and a second reduction mechanism connected to the second motor;
    the output rod includes a first output rod which switches at least two-wheel-drive mode and four-wheel-drive modes, and a second output rod which switches a reduction ratio and/or switches a locked state and a free state of a center differential under the four-wheel-drive mode;
    the housing includes a first chamber housing which houses the first motor and the first reduction mechanism and a second chamber housing which houses the second motor and the second reduction mechanism; and
    the temperature sensor is arranged in the first chamber.

3. The driving mode switching apparatus for the four-wheel-drive vehicle, according to claim 1, wherein
    the motor includes a first motor and a second motor;
    the reduction mechanism includes a first reduction mechanism connected to the first motor and a second reduction mechanism connected to the second motor;
    the output rod includes a first output rod which switches one of two-wheel-drive mode and four-wheel-drive modes, a reduction ratio, and a locked state and a free state of a center differential under the four-wheel-drive mode, and a second output rod which switches at least one of the rest of the two-wheel-drive and four-wheel-drive modes, the reduction ratio, and the locked state and free state of the center differential under the four-wheel-drive mode;
    the housing includes a first chamber housing which houses the first motor and the first reduction mechanism and a second chamber housing which houses the second motor and the second reduction mechanism; and
    the temperature sensor is arranged in the first chamber.

4. The driving mode switching apparatus for the four-wheel-drive vehicle, according to claim 1, wherein the temperature sensor is arranged at a position away from the reduction mechanism.

5. A driving mode switching apparatus for a four-wheel-drive vehicle, which switches driving modes of the four-wheel drive vehicle, comprising:
    a driving device;
    a reduction mechanism being transmitted with a rotational force of the driving device;
    an output member connected to the reduction mechanism and switching the driving modes by being displaced by the driving device;

a housing housing the driving device and the reduction mechanism;

a temperature sensor detecting ambient temperature in the housing; and a controller controlling an output property of the driving device in response to a detected temperature by the temperature sensor.

6. The driving mode switching apparatus for the four-wheel-drive vehicle according to claim 5, wherein the driving device includes a first driving device and a second driving device;

the reduction mechanism includes a first reduction mechanism connected to the first driving device and a second reduction mechanism connected to the second driving device;

the output member includes a first output member which switches at least two-wheel-drive mode and four-wheel-drive modes, and a second output member which switches a reduction ratio and/or switches a locked state and a free state of a center differential under the four-wheel-drive mode;

the housing includes a first chamber housing which houses the first driving device and the first reduction mechanism and a second chamber housing which houses the second driving device and the second reduction mechanism; and the temperature sensor is arranged in the first chamber.

7. The driving mode switching apparatus for the four-wheel-drive vehicle according to claim 5, wherein the temperature sensor is arranged at a position away from the driving device within the housing.

8. The driving mode switching apparatus for the four-wheel-drive vehicle according to claim 5, wherein the temperature sensor is arranged at a position away from the reduction mechanism within the housing.

9. The driving mode switching apparatus for the four-wheel-drive vehicle according to claim 5, wherein the temperature sensor is arranged at a position away from the driving device so that the temperature sensor is not directly in contact with the driving device.

10. The driving mode switching apparatus for the four-wheel-drive vehicle according to claim 5, wherein the temperature sensor is arranged at a position away from the reduction mechanism so that the temperature sensor is not directly in contact with the reduction mechanism.

11. The driving mode switching apparatus for the four-wheel-drive vehicle according to claim 5, wherein the driving device is a motor.

12. The driving mode switching apparatus for the four-wheel-drive vehicle according to claim 5, wherein the output member is an output rod.

* * * * *